United States Patent
Midya

(10) Patent No.: US 11,280,936 B2
(45) Date of Patent: Mar. 22, 2022

(54) LIQUID GAUGE AND A METHOD FOR OPERATING THE SAME

(71) Applicant: ADX Research, Inc., Schaumburg, IL (US)

(72) Inventor: Pallab Midya, Palatine, IL (US)

(73) Assignee: ADX Research, Inc., Schaumburg, IL (US)

( * ) Notice: Subject to any disclaimer, the term of this patent is extended or adjusted under 35 U.S.C. 154(b) by 0 days.

(21) Appl. No.: 15/819,436

(22) Filed: Nov. 21, 2017

(65) Prior Publication Data

US 2019/0154875 A1    May 23, 2019

(51) Int. Cl.
*G01W 1/14*    (2006.01)
*G01F 3/36*    (2006.01)

(52) U.S. Cl.
CPC ............... *G01W 1/14* (2013.01); *G01F 3/36* (2013.01)

(58) Field of Classification Search
CPC .............. G01F 3/36; G01F 3/38; G01W 1/14
See application file for complete search history.

(56) References Cited

U.S. PATENT DOCUMENTS

| | | | |
|---|---|---|---|
| 4,895,022 A * | 1/1990 | Noren .................... | G01W 1/14 73/170.17 |
| 5,125,268 A | 6/1992 | Caron | |
| 5,138,301 A * | 8/1992 | Delahaye ................ | G01W 1/14 340/602 |
| 6,609,422 B1 * | 8/2003 | Geschwender ........ | G01W 1/14 73/170.22 |
| 7,543,493 B2 | 6/2009 | Geschwender | |
| 7,552,632 B2 * | 6/2009 | Runge .................. | A01G 25/167 73/170.16 |
| 7,584,656 B2 | 9/2009 | Senghaas et al. | |
| 7,693,292 B1 | 4/2010 | Gross et al. | |
| 8,028,572 B2 | 10/2011 | Matsuda et al. | |
| 8,359,918 B1 | 1/2013 | Elnesr et al. | |

(Continued)

FOREIGN PATENT DOCUMENTS

WO    WO-2016176355 A1 *    11/2016    ............. G01W 1/14

OTHER PUBLICATIONS

C. David Stow, Stuart G. Bradley, Keith E. Farrington, Kim N. Dirks, and Warren R. Gray, A Rain Gauge for the Measurement of Finescale Temporal Variations, American Meteorological Society, Feb. 1998, 127-135, vol. 15.

(Continued)

*Primary Examiner* — Lisa M Caputo
*Assistant Examiner* — Alex T Devito
(74) *Attorney, Agent, or Firm* — Jason C. Cameron

(57) ABSTRACT

A liquid gauge is disclosed. The liquid gauge includes a plurality of holes configured to receive a plurality of liquid droplets of a first size. The liquid gauge also includes a plurality of curved structures configured to form an aggregated liquid droplet of a second size using the plurality liquid droplets of the first size. The liquid gauge further includes a plurality of counting electrodes configured to generate a corresponding electrical signal. The liquid gauge further includes a processing unit configured to count the aggregated liquid droplet of the second size received by each of the counting electrode and also configured to compute a total amount of liquid fall based on the aggregated liquid droplet of the second size.

14 Claims, 9 Drawing Sheets

(56) References Cited

U.S. PATENT DOCUMENTS 8,573,049 B1 11/2013 Ware
2008/0034859 A1 2/2008 Runge et al.

OTHER PUBLICATIONS

Jeffrey A. Nystuen, Relative Performance of Automatic Rain Gauges under Different Rainfall Conditions, American Meteorological Society, Aug. 1999, 1025-1043, vol. 16.

Ali Tokay, Paul Bashor, David B. Wolff and Katherine R. Wolff, Rain Gauge and Disdrometer Measurements during the Keys Area Microphysics Project (KAMP), American Meteorological Society, Nov. 2003, 1460-1477, vol. 20.

Ali Tokay, Walter A. Petersen, Patrick Gatlin and Matthew Wingo, Comparison of Raindrop Size Distribution Measurements by Collocated Disdrometers, American Meteorological Society, Aug. 2013, 1672-1690, vol. 30.

Jeffrey A. Nystuen, Relative Performance of Automatic Rain Gauges under Different Rainfall Conditions, Applied Physics Laboratory, Oct. 9, 1998.

C. David Stow, Stuart G. Bradley, Keith E. F Arrington, Kim N. D Irks, and Warren R. Gray, 2. A Rain Gauge for the Measurement of Finescale Temporal Variations, Applied Physics Laboratory, May 1, 1997.

Paul Bashor, Rain Gauge and Disdrometer Measurements during the Keys Area Microphysics Project (KAMP), Computer Sciences Corporation, May 2, 2003.

P.W. Chan & C.M. Li, Performance of drop-counting rain gauges in an operational environment, Conference on Integrated Observing and Assimilation Systems for Atmosphere, Oceans, and Land Surface, Jan. 11-16, 2009, vol. 13.

Gopinath Kathiravelu, Terry Lucke and Peter Nichols, Rain Drop Measurement Techniques, Stormwater Research Group, Jan. 21, 2016.

* cited by examiner

LIQUID GAUGE AND A METHOD FOR OPERATING THE SAME

BACKGROUND

Embodiments of a present disclosure relates to a measuring instrument, and more particularly to a liquid gauge and a method for operating the same.

A liquid gauge is used to measure an amount of liquid that is falling over a set period of time in different applications. One such application includes measuring the amount of precipitation over the set period of time. Different types of liquid gauges are used to measure the amount of precipitation, which include a standard rain gauge, a pluviometer, a weighing precipitation gauge, a tipping bucket rain gauge, an optical rain gauge and an acoustic disdrometer.

The standard rain gauge includes a funnel emptying into a graduated cylinder which fits inside a large container. If the water overflows the graduated cylinder the large container catches the water. When measurements are taken, the height of the water in the graduated cylinder is measured, and the excess overflow in the large container is carefully poured into another graduated cylinder and measured to give the total rainfall. However, such gauge results in a leakage of the water which leads to false measurement.

The weighing precipitation gauge includes a storage bin, which is weighed to record the mass. Various methods are used to measure the mass using a pen on a rotating drum, or by using a vibrating wire attached to a data logger. However, such gauges are expensive, require a lot of maintenance and require a calibration each time for measurement.

The tipping bucket gauge includes two specially designed buckets tip. when the weight of 0.01 inches of rain falls into one bucket tips, the other bucket quickly moves into place to catch the rain. Each time a bucket tips, an electronic signal is sent to a recorder. To calculate the rainfall for a certain time period, the number of marks on the recorder is multiplied by 0.01 inches. However, the tipping bucket rain gauge is not as accurate as the standard rain gauge because the rainfall may stop before the lever has tipped.

The optical rain gauge includes a row of collection funnels. In an enclosed space below each funnel there is a laser diode and a photo transistor detector. When enough water is collected to make a single water drop, the single water drop falls from the bottom, falling into the laser beam path. A sensor is set at right angles to the laser so that enough light is scattered to be detected as a sudden flash of light. The flashes from such sensors are then read and transmitted or recorded. However, such gauges do not provide a constant size water drop. Also, in case of heavy rain, instead of making the single water drop, a stream of water falls from the bottom of the collection funnel.

The several types of liquid gauges explained above do not provide the compensation for multiple parameters such as temperature, viscosity, fall rate and the height of the water in the reservoir. Also, such gauges do not provide the diagnosis of various faults such as clogging, tilting and aging.

Hence, there is a need for an improved liquid gauge and the method for operating the same to address the aforementioned issues.

BRIEF DESCRIPTION

In accordance with one embodiment of the disclosure, a liquid gauge is provided. The liquid gauge includes a plurality of holes. The plurality of holes is configured to receive a plurality of liquid droplets of a first size. The liquid gauge also includes a plurality of curved structures. The plurality of curved structures is configured to form an aggregated liquid droplet of a second size using the plurality liquid droplets of the first size, where each of the curved structure is operatively coupled to a corresponding hole through a canal. The liquid gauge further includes a plurality of counting electrodes. The counting electrodes are configured to generate a corresponding electrical signal, where each of the counting electrode generates the corresponding electrical signal upon receiving the aggregated liquid of the second size. The liquid gauge further includes a processing unit operatively coupled to the plurality of counting electrodes. The processing unit is configured to count the aggregated liquid droplet of the second size received by each of the counting electrode. The processing unit is also configured to compute a total amount of liquid fall based on the aggregated liquid droplet of the second size.

In accordance with another embodiment of the disclosure, a method is provided. The method includes receiving a plurality liquid droplets of a first size. The method also includes forming an aggregated liquid droplet of a second size using the plurality liquid droplets of the first size. The first size corresponds to the incident rain drops. The second size is substantially constant independent of the size of the first size. The method further includes generating an electrical signal based on the aggregated liquid droplet of the second size. The method further includes counting the aggregated liquid droplet of the second size based on the electrical signal. The method further includes computing a total amount of liquid fall based on the aggregated liquid droplet of the second size.

In accordance with yet another embodiment of the disclosure, a rain droplet gauge is provided. The rain droplet gauge includes a plurality of holes. The plurality of holes is configured to receive a plurality of rain droplets of a first size. The rain droplet gauge also includes a plurality of curved structures. The plurality of curved structures is configured to form an aggregated rain droplet of a second size using the plurality rain droplets of the first size, where each of the curved structure is operatively coupled to a corresponding hole through a canal. The rain droplet gauge further includes a plurality of counting electrodes. The plurality of counting electrodes is configured to generate a corresponding electrical signal, where each of the counting electrode generates the corresponding electrical signal upon receiving the aggregated rain droplet of the second size. The rain droplet gauge further includes a processing unit operatively coupled to the plurality of counting electrodes. The processing unit is configured to count the aggregated rain droplet of the second size received by each of the counting electrode. The processing unit is also configured to compute a total amount of rain fall based on the aggregated rain droplet of the second size.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
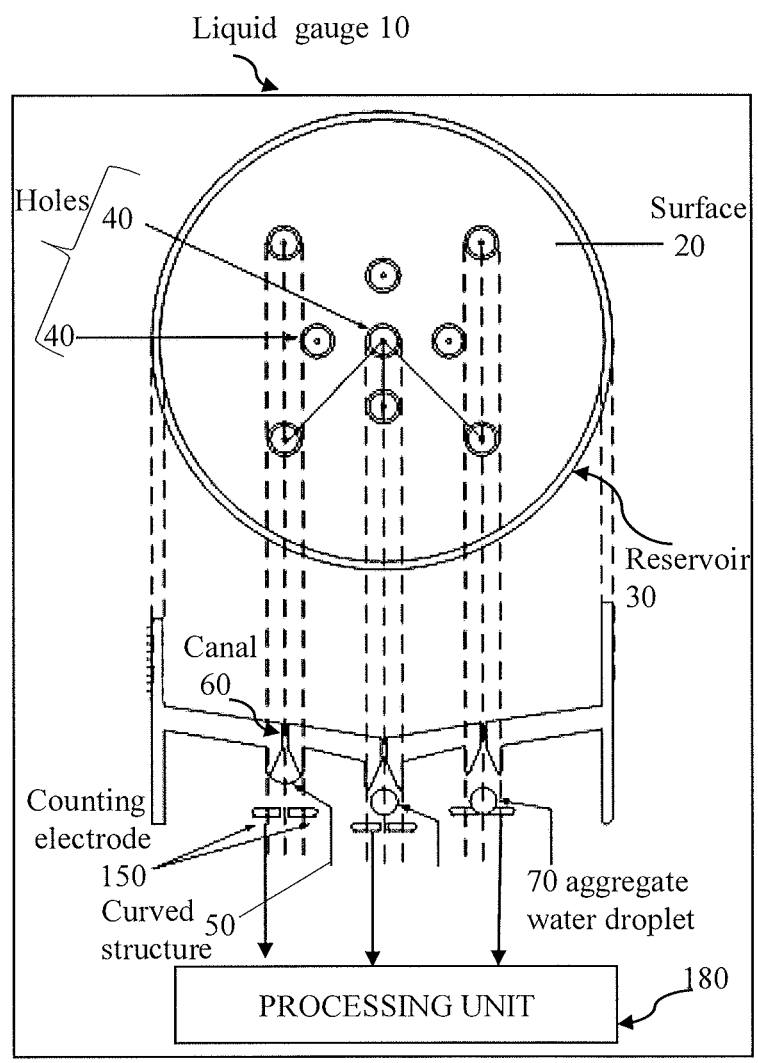
FIG. 1 illustrates a schematic representation of a liquid gauge in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a liquid gauge. The liquid gauge includes a plurality of holes. The plurality of holes is configured to receive a plurality of liquid droplets of a first size. The liquid gauge also includes a plurality of curved structures. The plurality of curved structures is configured to form an aggregated liquid droplet of a second size using the plurality liquid droplets of the first size, where each of the curved structure is operatively coupled to a corresponding hole through a canal.

The liquid gauge further includes a plurality of counting electrodes. The counting electrodes are configured to generate a corresponding electrical signal, where each of the counting electrode generates the corresponding electrical signal upon receiving the aggregated liquid droplet of the second size. The liquid gauge further includes a processing unit operatively coupled to the plurality of counting electrodes. The processing unit is configured to count the aggregated liquid droplet of the second size received by each of the counting electrode. The processing unit is also configured to compute a total amount of liquid fall based on the aggregated liquid droplet of the second size.

FIG. 1 illustrates a schematic representation of a liquid gauge 10 in accordance with an embodiment of the present disclosure. The liquid gauge 10 includes a surface 20. In one embodiment, the surface 20 may include a curved shape. In such embodiment, the curved shape may act as a reservoir 30. The reservoir 30 is configured to collect a plurality of liquid droplets of the first size falling on the surface 20. In some embodiments, the plurality of liquid droplets of the first size may include a plurality of liquid droplets of different sizes.

The liquid gauge 10 also includes a plurality of holes 40. In a specific embodiment, the plurality of holes 40 may be located on the surface 20 of the liquid gauge 10. The plurality of holes 40 is configured to receive the plurality of liquid droplets of the first size. In one embodiment, the plurality of holes 40 may receive the plurality of liquid droplets of first size collected by the reservoir 30.

Also, the liquid gauge 10 includes a plurality of curved structures 50. Each of the curved structure 50 is operatively coupled to the corresponding hole 40 through a canal 60. The canal 60 is configured to convey the plurality of liquid droplets of the first size from the plurality of holes 40 to the corresponding plurality of curved structure 50 to form an aggregated liquid droplet 70 of a second size using the plurality liquid droplets of the first size. In some embodiments, the aggregated liquid droplet 70 of the second size may include the aggregated liquid droplet of a constant size. In a specific embodiment, the plurality of curved structures 50 may include a plurality of concave structures. In such embodiment, the plurality of concave structures may include a conical structure or a hemispherical structure. One such embodiment of the curved structure 50 is described in FIG. 2.

Figure 2:
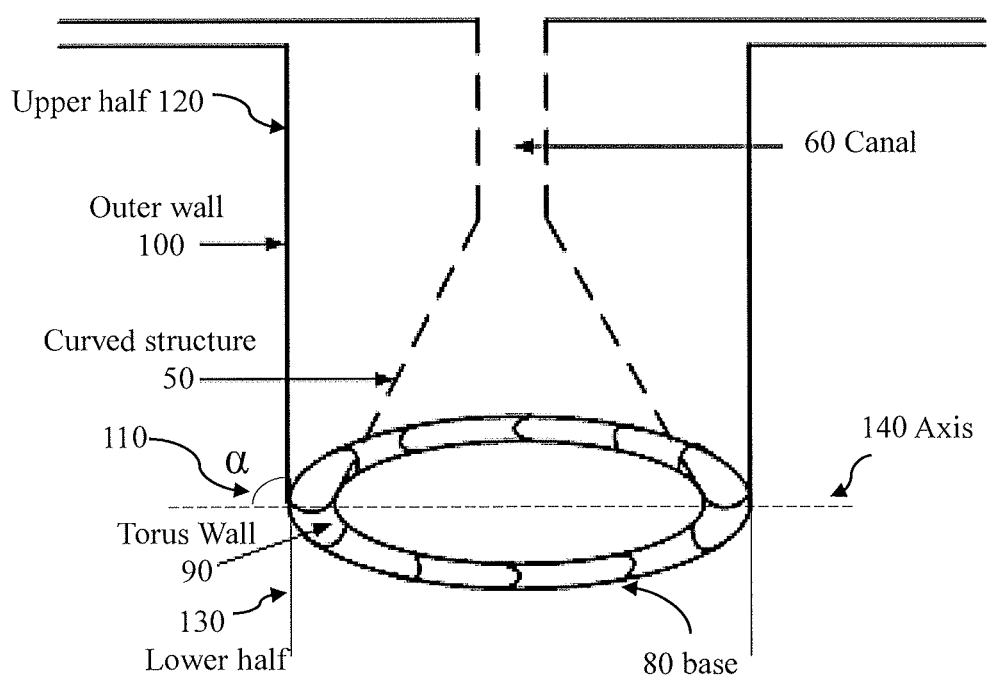
FIG. 2 illustrates a schematic representation of a curved structure of the liquid gauge of FIG. 1 in accordance with an embodiment of the present disclosure.

FIG. 2 illustrates a schematic representation of the curved structure 50 in accordance with an embodiment of the present disclosure. In one embodiment, each of the plurality of curved structures 50 may include a base, where the base 80 may include a torus structure 90. In such embodiment, the curved structure 50 may include an outer wall 100, where the outer wall 100 is at an angle α represented by a numeral 110 with respect to the torus structure 90. The outer wall 100 is divided into an upper half 120 and a lower half 130 using an axis 140. The angle 110 between the outer wall 100 and the axis 140 lies in the upper half 120. In one embodiment, the outer wall 100 may be at 90 degree angle with respect to the axis 140.

With continued reference to FIG. 1, the liquid gauge 10 further includes a plurality of counting electrodes 150. Each of the counting electrode 150 is situated below the corresponding curved structure 50. The plurality of counting electrodes 150 are configured to generate a corresponding electrical signal upon receiving the corresponding aggregated liquid droplet 70 of the second size operation of which is explained in FIG. 3 in detail. In one embodiment, the plurality of counting electrodes 150 are configured to generate a corresponding digital signal.

Figure 3:
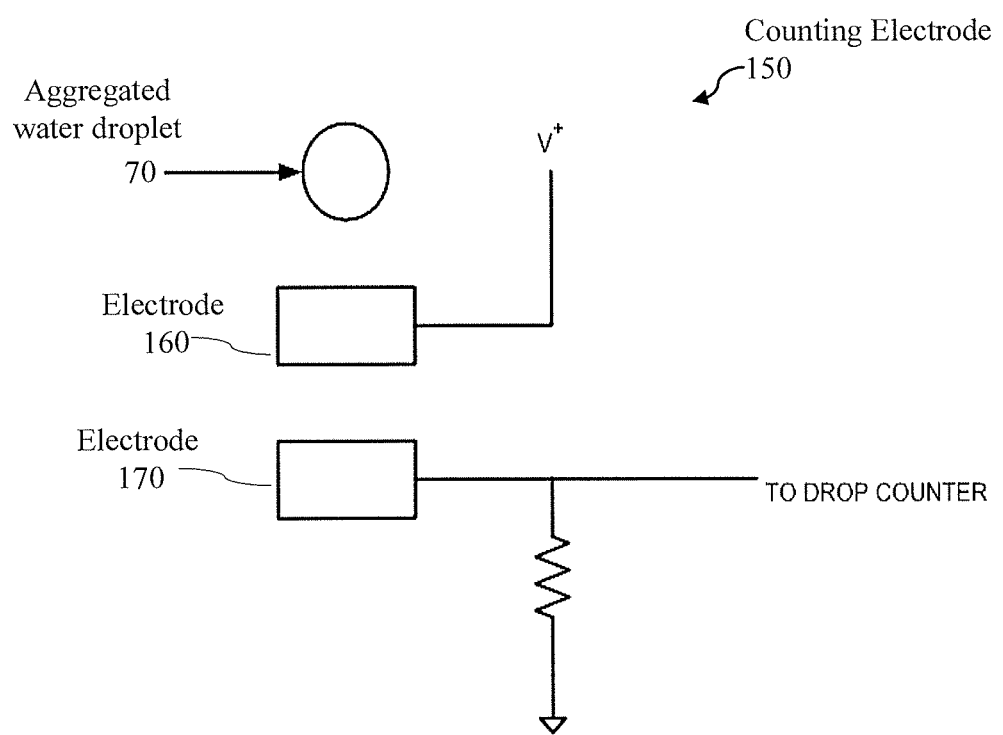
FIG. 3 illustrates a schematic representation of a counting electrode of the liquid gauge of FIG. 1 in accordance with an embodiment of the present disclosure.

FIG. 3 illustrates a schematic representation of the counting electrode 150 in accordance with an embodiment of the present disclosure. In operation, a potential V$^+$ is applied to an electrode A 160. As the aggregated liquid droplet 70 of the second size drop on the electrode A 160 at time T, a current is passes from electrode A 160 to electrode B 170 at time T+dT and generate a digital pulse as an output. Similarly, for other aggregated liquid droplets 70 corresponding counting electrode 150 generate corresponding digital pulse.

Referring to FIG. 1, the liquid gauge further 10 includes a processing unit 180 operatively coupled to the plurality of counting electrodes 150. The processing unit 180 is configured to count the aggregated liquid droplet 70 of the second size received by each of the counting electrode 150. The processing unit 180 is also configured to compute a total amount of liquid fall based on the aggregated liquid droplet 70 of the second size.

Figure 4:
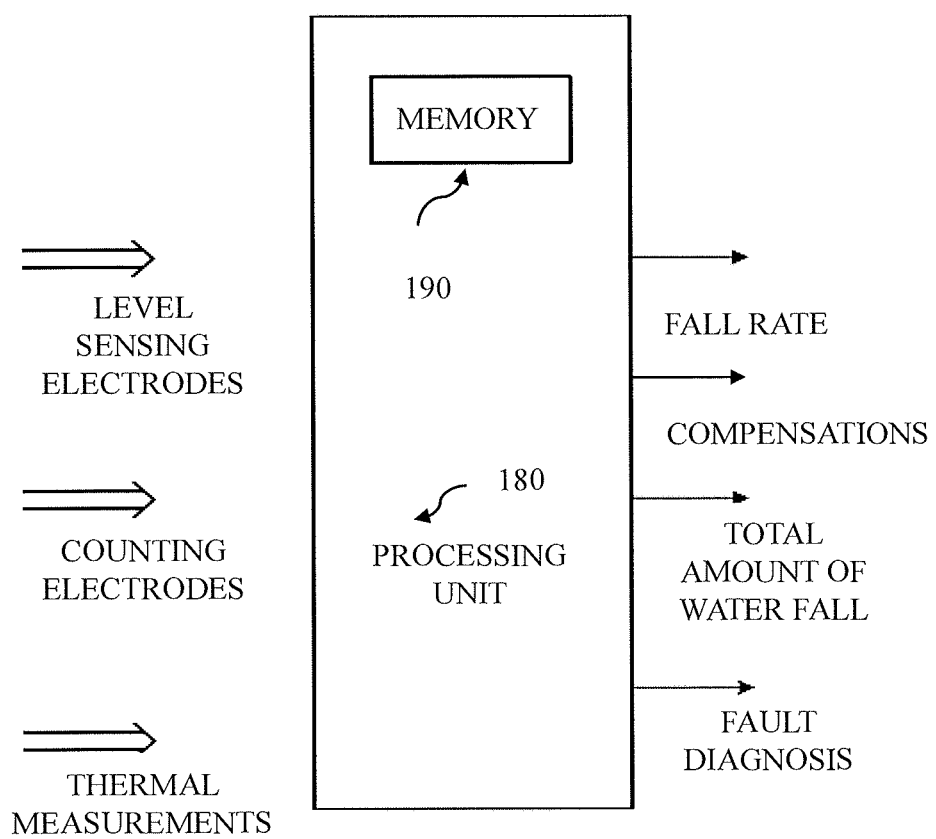
FIG. 4 illustrates a schematic representation of a processing unit of the liquid gauge of FIG. 1 in accordance with an embodiment of the present disclosure.

FIG. 4 illustrates a schematic representation of the processing unit 180 in accordance with an embodiment of the present disclosure. The processing unit 180 is operatively coupled to the plurality of counting electrodes 150. The processing unit 180 includes a memory 190. The memory 190 is configured to store a pre-defined data. In one embodiment, the pre-defined data may include a lookup table. The lookup table generate a result about the change in one parameter with respect to change in another parameter. In one embodiment, the processing unit 180 is configured to receive each of the electrical signal from the corresponding plurality of counting electrodes 150.

The processing unit 180 is configured to count each of the aggregated liquid droplet 70 of the second size received by the corresponding counting electrode 150. In some embodiments, a plurality of digital signal pulses generated by the plurality of counting electrodes 150 are counted to count the aggregated liquid droplet 70 of the second size.

The processing unit 180 is also configured to compute a total amount of liquid fall based on the aggregated liquid droplet 70 of the second size. In one embodiment, the processing unit 180 may be configured to measure a fall rate based on the total amount of liquid fall. The fall rate is the ratio of the total amount of liquid fall or liquid fall depth falling during a given period to the duration of the period. The fall rate is expressed in depth units per unit time, usually as millimetre per hour or inch per hour.

In another embodiment, the processing unit 180 may be configured to provide at least one compensation. In such embodiment, the at least one compensation may include a temperature compensation, a viscosity compensation, a fall rate compensation, and a compensation for height of the plurality liquid droplets in the reservoir.

The temperature affects a plurality of parameters indirectly. In one embodiment, the plurality parameters may include a viscosity, a pressure, a fall rate or a height of the plurality liquid droplets in the reservoir 30. In one example, any change in temperature may affect the size of the aggregated liquid droplet 70. Therefore, to accurately measure the total amount of liquid fall, the temperature compensation is performed based on the lookup table stored in the memory 190 of the processing unit 180.

Furthermore, the viscosity is inversely proportional to temperature of the aggregated liquid droplet. Therefore, an increase in the temperature results in the decrease of the viscosity of the aggregated liquid droplet, which further leads to early fall of the aggregated liquid droplet prior to attaining the constant size. Hence, the viscosity compensation is performed based on the lookup table to obtain the correct size of the aggregated liquid droplet.

Similarly, the temperature also affects the fall rate and the height of the plurality liquid droplets in the reservoir. For example, as the temperature increases the fall rate increases and the height of the plurality liquid droplets in the reservoir 30 also increase. Hence, for desired results the fall rate compensation and the compensation in the height of the plurality of liquid droplets in the reservoir 30 is performed based on the lookup table.

In yet another embodiment, the processing unit 180 is configured to identify a plurality of faults. In such embodiment, the plurality of faults may include a clogging fault, a tilting fault and an aging fault. Over a long-time period, the plurality of holes 40 may get blocked due to the accumulation of dust. There may also be debris blown in by the wind, bird droppings or leaves which may clog the plurality of holes 40. The clogging fault may be detected by detecting an absence of the plurality of liquid droplets from a certain hole or imbalance of fall rate. The tilting fault may be detected by looking at the fall rate differential between the plurality of droplets on one side relative to the opposite side. The aging fault may be detected by a reduction of fall rate.

Figure 5:
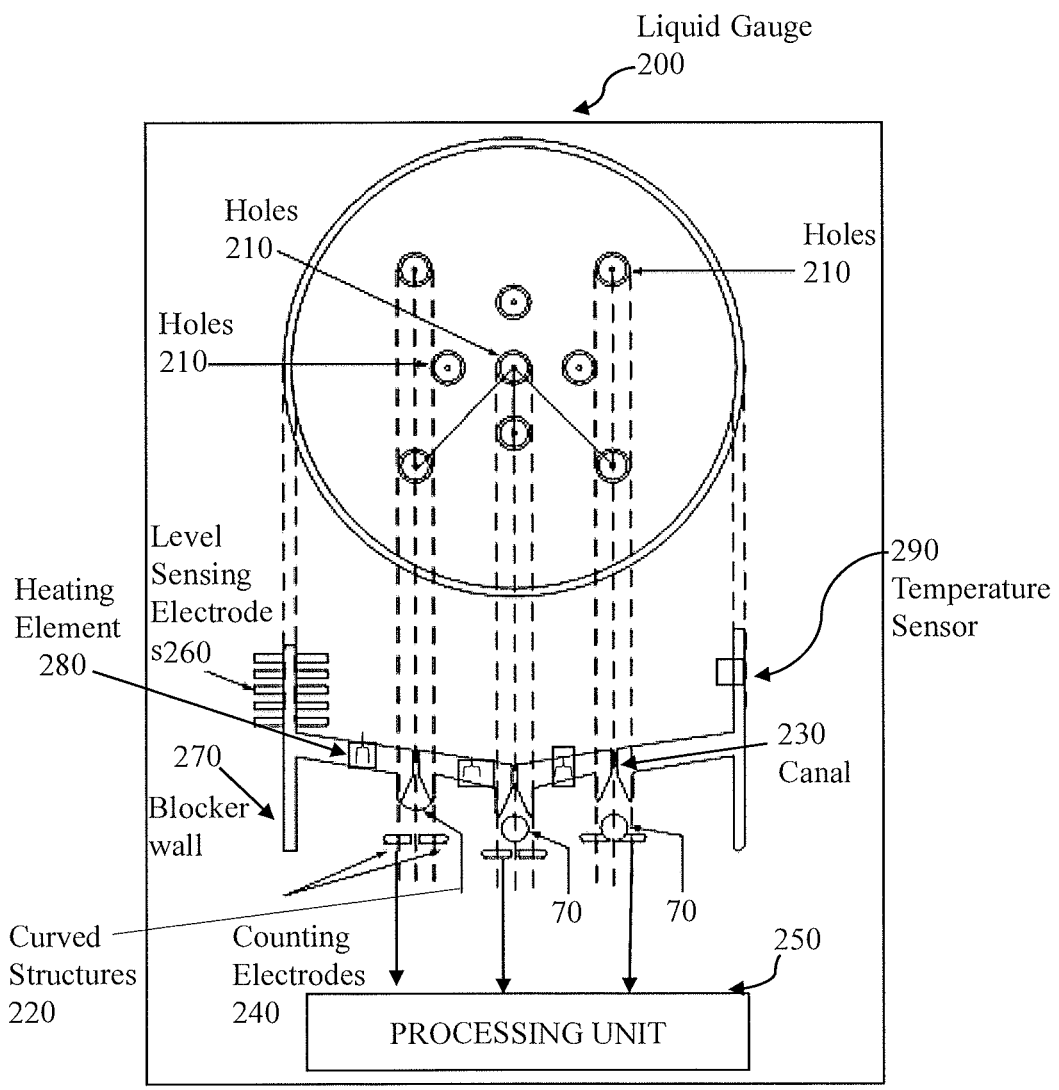
FIG. 5 illustrates a schematic representation of an exemplary liquid gauge of FIG. 1 in accordance with an embodiment of the present disclosure.

FIG. 5 illustrates a schematic representation of an exemplary liquid gauge 200 in accordance with an embodiment of the present disclosure. The exemplary liquid gauge 200 includes a plurality of holes 210 operatively coupled to a plurality of curved structures 220 through a canal 230, a plurality of counting electrodes 240 and a processing unit 250 substantially similar to a plurality of holes 40, a plurality of curved structures 50, a canal 60, a plurality of counting electrodes 150 and a processing unit 180 of FIG. 1. In addition, in one embodiment, the exemplary liquid gauge 200 may include a plurality of level sensing electrodes 260. The plurality of level sensing electrodes 260 is configured to sense a liquid level in the reservoir 30.

In such embodiment, the level measurement may be a continuous level measurement. In continuous level measurement, the plurality of level sensing electrodes 260 measures level within a specified range and determine the exact amount of liquid in the reservoir 30. In another embodiment, the level measurement may be a point values level measurement. In point values level measurement, the plurality of level sensing electrodes 260 only indicates whether the substance is above or below a sensing point and generate a signal. In one embodiment, the signal is sent to the processing unit (FIG. 4) of liquid gauge 10.

In some embodiments, the exemplary liquid gauge 200 may include a blocker wall 270. The blocker wall 270 is configured to eliminate wind effects. The wind increases a relative velocity of the plurality of liquid droplets of the first size and causes them to collide and stick together until the aggregated liquid droplet 70 forms the second size and ready for falling. Also, the wind may change an angle of fall of the aggregated liquid droplet 70. Hence, the blocker wall 270 prevents the wind from affecting the formation of the aggregated liquid droplet 70 of second size.

In one embodiment, the exemplary liquid gauge 200 may include a heating element 280 coupled with the reservoir 30. In a specific embodiment, the plurality of holes 210 of the exemplary liquid gauge 200 is configured to receive a corresponding sleet, a snow, a graupel or a hail. The heating element 280 is configured to melt the sleet, the snow, the graupel or the hail to obtain a plurality of liquid droplets. The plurality of curved structures 220 is then used to form an aggregated liquid droplet 70 using the plurality liquid droplets. In one embodiment, the heating element may be controlled remotely for activating and deactivating the heating element.

In some embodiments, the exemplary liquid gauge 200 may include a temperature sensor 290. The temperature sensor 290 is configured to measure an environmental temperature.

Figure 6:
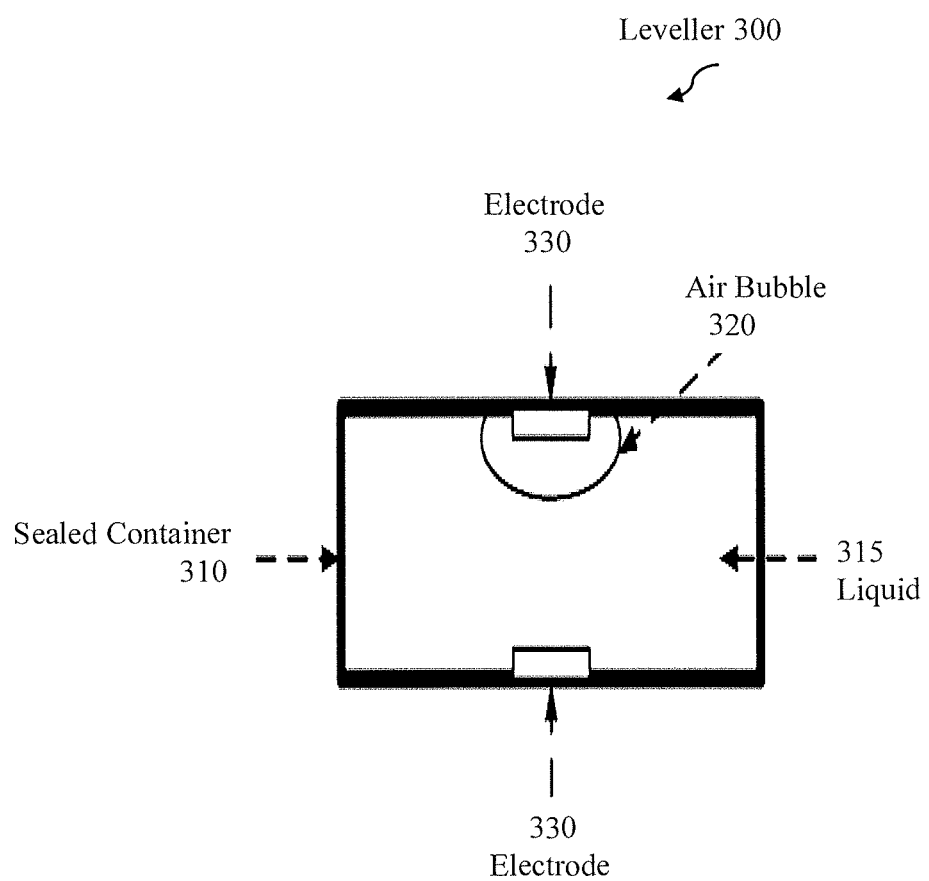
FIG. 6 illustrates a schematic representation of a leveller of liquid gauge of FIG. 1 in accordance with an embodiment of the present disclosure.

FIG. 6 illustrates a schematic representation of a leveller 300 in accordance with an embodiment of the present disclosure. The leveller 300 is configured to monitor an alignment of the liquid gauge 10 and generate an alert in case of misalignment. The leveller 300 includes a sealed container 310 filled with a liquid 315 and a pair of electrodes 330 located at opposite sides of the inner walls of the sealed container 310. In one embodiment, the liquid 315 may include an electrically conducting liquid. The liquid 315 is filled in the container such that an air bubble 320 encloses one of the electrodes 330, when leveller 300 is in a default position representing proper alignment. Therefore, in a default position, the pair of electrodes 330 are isolated from each other due to the air bubble 320. In operation, upon any deviation from the default position, such as inclination of the liquid gauge 10 in any direction, the air bubble 320, moves from its default position, due to which the pair of electrodes 330 come in contact with the liquid 315, which allows the pair of electrodes 330 to conduct between each other, thus generating an alter signal. Such an alert signal cautions an operator/user that the liquid gauge 10 is not in its default position and measures should be taken to rectify the results of such liquid gauge 10.

Figure 7:
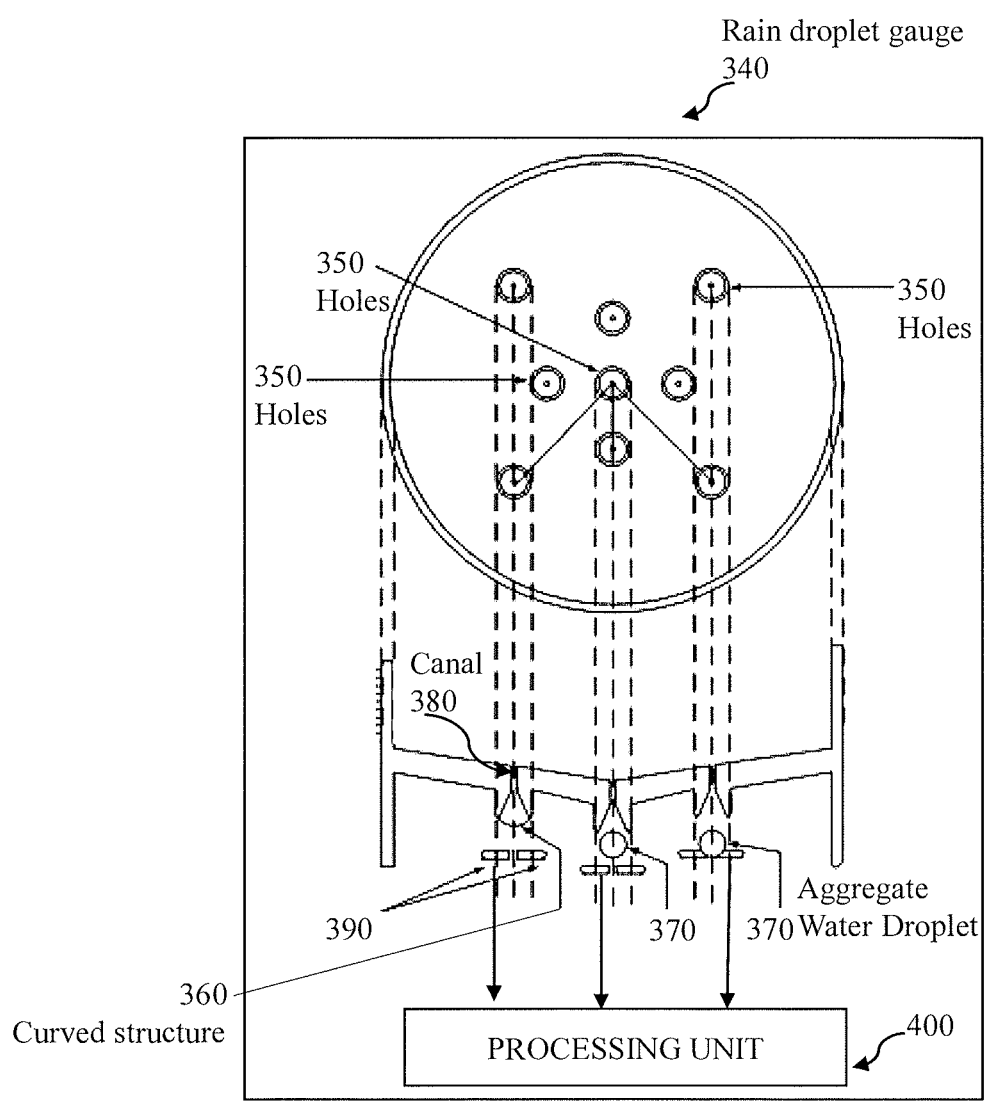
FIG. 7 illustrates a schematic representation of one embodiment of the liquid gauge of FIG. 1 in accordance with the present disclosure.

FIG. 7 illustrates a schematic representation of an embodiment of the liquid gauge 10 in accordance with the present disclosure. In one embodiment, the liquid gauge 10 may be a water droplet gauge. In some embodiments, the water droplet gauge may be a rain droplet gauge 340. The rain droplet gauge 340 includes a plurality of holes 350. The plurality of holes 350 is configured to receive a plurality of rain droplets of a first size.

Also, the rain droplet gauge 340 includes a plurality of curved structures 360. The plurality of curved structures 360 is configured to form an aggregated rain droplet 370 of a second size using the plurality rain droplets of the first size, where each of the curved structure 360 is operatively coupled to a corresponding hole 350 through a canal 380.

The rain droplet gauge 340 further includes a plurality of counting electrodes 390. The plurality of counting electrodes 390 is configured to generate a corresponding electrical signal, where each of the counting electrode 390 generates the corresponding electrical signal upon receiving the aggregated rain droplet 370 of the second size.

Furthermore, the rain droplet gauge 340 includes a processing unit 400 operatively coupled to the plurality of counting electrodes 390. The processing unit 400 is configured to count the aggregated rain droplet 370 of the second size received by each of the counting electrode 390. The processing unit 400 is also configured to compute a total amount of rain fall based on the aggregated rain droplet 370 of the second size.

The plurality of holes 350, the plurality of curved structures 360, the canal 380, the plurality of counting electrodes 390 and the processing unit 400 of the rain droplet gauge 340 are substantially similar to the plurality of holes 40, the plurality of curved structures 50, the canal 60, the plurality of counting electrodes 150 and the processing unit 180 of the liquid gauge of FIG. 1.

Figure 8:
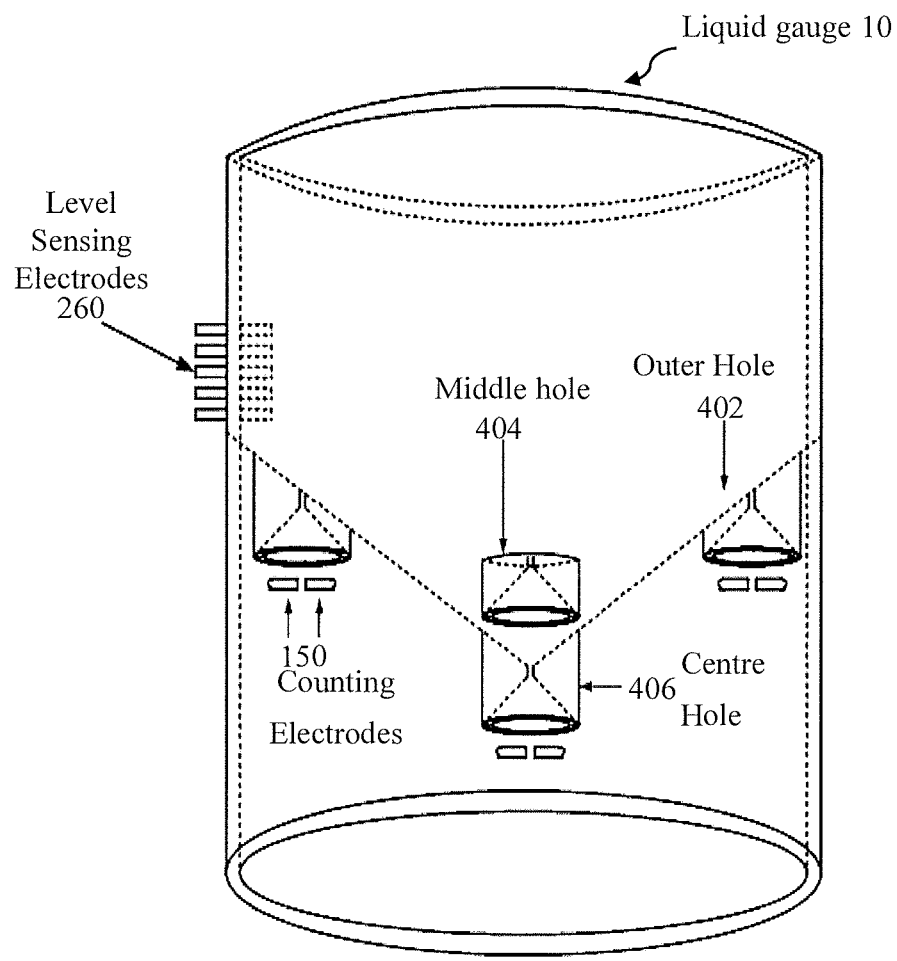
FIG. 8 illustrates a schematic representation of one embodiment of the liquid gauge of FIG. 1 in accordance with an embodiment of the present disclosure.
Figure 9:
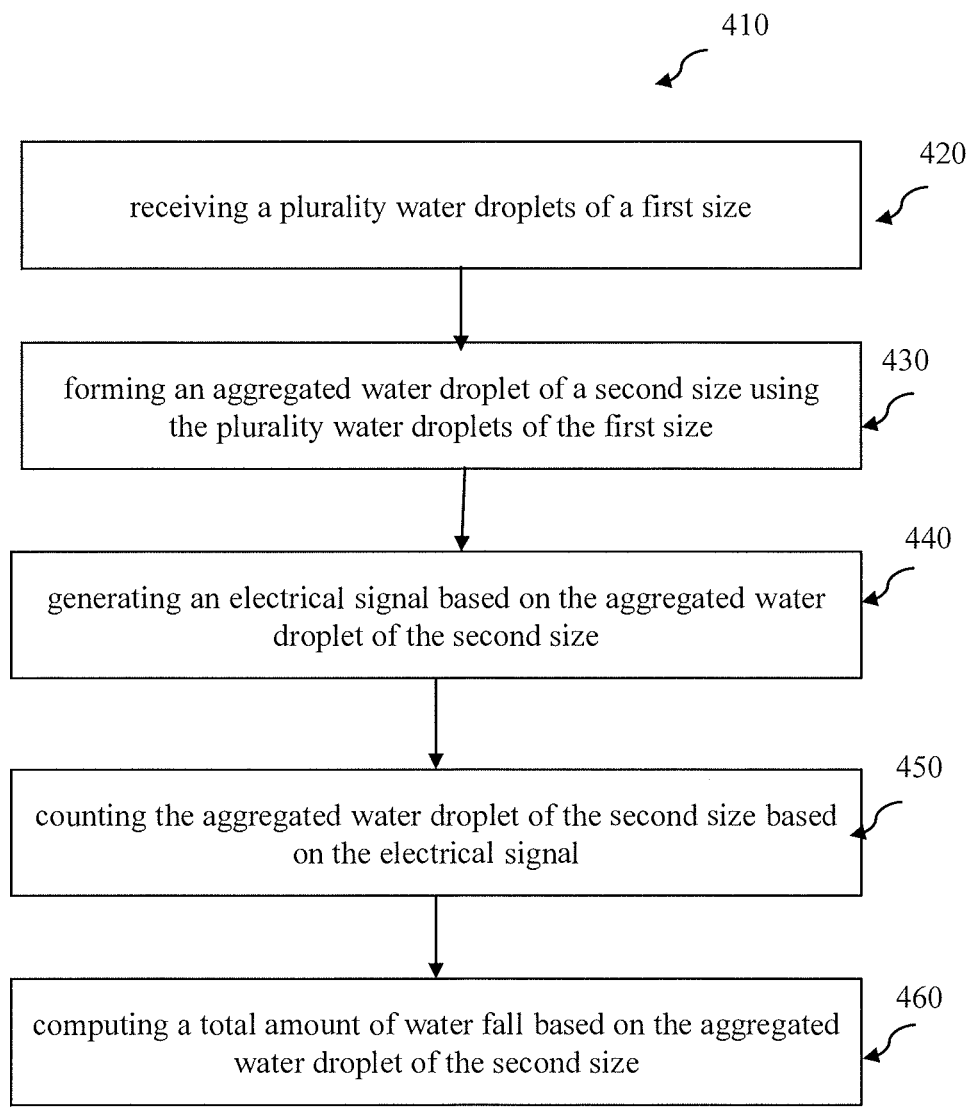
FIG. 9 illustrates a flow chart representing the steps involved in a method for computing a total amount of liquid fall using the liquid gauge of FIG. 1 in accordance with an embodiment of the present disclosure.

FIG. 8 illustrates a schematic representation of one embodiment of the liquid gauge 10 of FIG. 1 in accordance with an embodiment of the present disclosure. The liquid gauge 10 includes the plurality of holes 40. In one embodiment, the plurality of holes 40 may include a plurality of outer holes 402, one or more middle holes 404 and a centre hole 406. The centre hole 406 receives the plurality of liquid droplets of the first size when there is very little liquid fall. In case of stronger liquid fall, both the centre hole 406 and the one or more middle holes 404 receive the plurality of liquid droplets of first size. During a vigorous liquid fall, the plurality of outer holes 402, the one or more middle holes 404 and the centre holes 406 receive the plurality of liquid droplets of the first size. In some embodiments, the centre hole 406 is configured to receive maximum of the plurality of liquid droplets of first size when the liquid gauge 10 is aligned properly. In operation, upon any deviation from the default position, such as inclination of the liquid gauge 10 in any direction, the plurality of outer holes 402 starts receiving maximum of the plurality of liquid droplets of first size. FIG. 9 illustrates a flow chart representing the steps involved in a method 410 for computing a liquid fall in accordance with an embodiment of the present disclosure. The method 410 includes receiving a plurality liquid droplets of a first size in step 420. The method 410 also includes forming an aggregated liquid droplet of a second size using the plurality liquid droplets of the first size in step 430.

Also, the method 410 includes generating an electrical signal based on the aggregated liquid droplet of the second size in step 440. The method 410 further includes counting the aggregated liquid droplet of the second size based on the electrical signal in step 450. In one embodiment, counting the aggregated liquid droplet of the second size based on the electrical signal may include counting the aggregated liquid droplet by extracting the electrical signal from a plurality of counting electrodes.

Furthermore, the method 410 includes computing a total amount of rain fall based on the aggregated rain droplet of the second size in step 460. In a specific embodiment, computing a total amount of rain fall based on the aggregated rain droplet of the second size may include computing the total amount of liquid fall using an optical laser method in combination with a conventional pluviometry method.

In some embodiments, the method may include measuring a fall rate based on the total amount of liquid fall. In such embodiment, measuring a fall rate based on the total amount of liquid fall may include measuring a fall rate using a video measurement (2DVD) method, a laser precipitation monitoring method or an optical spectral pluviometry method.

The various embodiments of the liquid gauge described above enables the measurement of the total amount of liquid fall, the fall rate and the counting of the liquid droplets more accurately than the conventional gauges.

Also, the liquid gauge provides a plurality of constant size liquid droplets for various measurements. The problem of formation of stream line of liquid instead of the formation of the aggregated liquid droplet due to various reasons is solved since, the plurality of curved structures with torus shape and blocker wall are used to form the aggregated liquid droplet.

Furthermore, the liquid gauge provides the compensation of at least one parameter such as the temperature compensation, the viscosity compensation, the fall rate compensation, and the compensation for height of the plurality liquid droplets in the reservoir based on the predefined data stored in the processing unit.

Moreover, the liquid gauge identifies the plurality of faults such as a clogging fault, a tilting fault and an aging fault which helps in better functioning of the liquid droplet gauge than the conventional gauges. Additionally, in liquid gauge there is no need of calibration of the liquid gauge during the installation.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A liquid gauge comprising:
a curved shape surface configured to form a reservoir, wherein the reservoir is configured to collect a plurality of liquid droplets of a first size falling on the curved shape surface,
a plurality of holes located on the curved shape surface of the liquid gauge, wherein the plurality of holes is configured to receive the plurality of liquid droplets of the first size collected by the reservoir,
a plurality of conical structures located below the plurality of holes, wherein each of the conical structures is operatively coupled to a corresponding hole through a canal and are arranged in a horizontal plane and parallel to each other, wherein each of the plurality of conical structures comprises a base, wherein the base comprises a torus structure configured to form an aggregated liquid droplet of a second size using the plurality of liquid droplets of the first size received from the plurality of holes through the canals,
a plurality of counting electrodes configured to generate a corresponding electrical signal, wherein each of the counting electrodes generates the corresponding electrical signal upon receiving the aggregated liquid droplet of the second size, and
a processing unit operatively coupled to the plurality of counting electrodes, and configured to:
count the aggregated liquid droplets of the second size received by each of the counting electrodes, and
compute a total amount of liquid fall based on the count of the aggregated liquid droplets of the second size.

2. The system of claim 1, wherein the liquid gauge comprises a water droplet gauge.

3. The system of claim 1, wherein the liquid gauge comprises a cylindrical liquid gauge.

4. The system of claim 1, wherein each of the conical structures comprises an outer wall, wherein the outer wall is at an angle with respect to the torus structure.

5. The system of claim 1, wherein the processing unit is configured to measure a fall rate based on the total amount of liquid fall.

6. The system of claim 1, wherein the processing unit is configured to provide at least one compensation.

7. The system of claim 6, wherein the at least one compensation comprises at least one of a temperature compensation, a viscosity compensation, a fall rate compensation, and a compensation for a height of the plurality of liquid droplets in the reservoir.

8. The system of claim 1, wherein the processing unit is configured to identify a plurality of faults.

9. The system of claim 8, wherein the plurality of faults comprises at least one of a clogging fault, a tilting fault and an aging fault.

10. The system of claim 1, further comprising a plurality of level sensing electrodes configured to sense a liquid level in the reservoir.

11. The system of claim 1, further comprising a blocker wall configured to eliminate wind effects.

12. The system of claim 1, further comprising a leveller configured to monitor an alignment of the liquid gauge and generate an alert.

13. The system of claim 1, further comprising a heating element coupled with the reservoir and controlled remotely.

14. A rain droplet gauge comprising:
a curved shape surface configured to form a reservoir, wherein the reservoir is configured to collect a plurality of rain droplets of a first size falling on the curved shape surface,
a plurality of holes located on the curved shape surface of the liquid gauge, wherein the plurality of holes is configured to receive the plurality of rain droplets of the first size collected by the reservoir,
a plurality of conical structures located below the plurality of holes, wherein each of the conical structures is operatively coupled to a corresponding hole through a canal and are arranged in a horizontal plane and parallel to each other, wherein each of the plurality of conical structures comprises a base, wherein the base comprises a torus structure is configured to form an aggregated rain droplet of a second size using the plurality of rain droplets of the first size received from the plurality of holes through the canals,
a plurality of counting electrodes configured to generate a corresponding electrical signal, wherein each of the counting electrodes generates the corresponding electrical signal upon receiving the aggregated rain droplet of the second size, and
a processing unit operatively coupled to the plurality of counting electrodes, and configured to:

count the aggregated rain droplets of the second size received by each of the counting electrodes, and compute a total amount of rain fall based on the count of the aggregated rain droplets of the second size.

\* \* \* \* \*